Dec. 1, 1953     W. F. MacGLASHAN, JR     2,660,834
PRESSURE REGULATOR
Filed Feb. 11, 1949
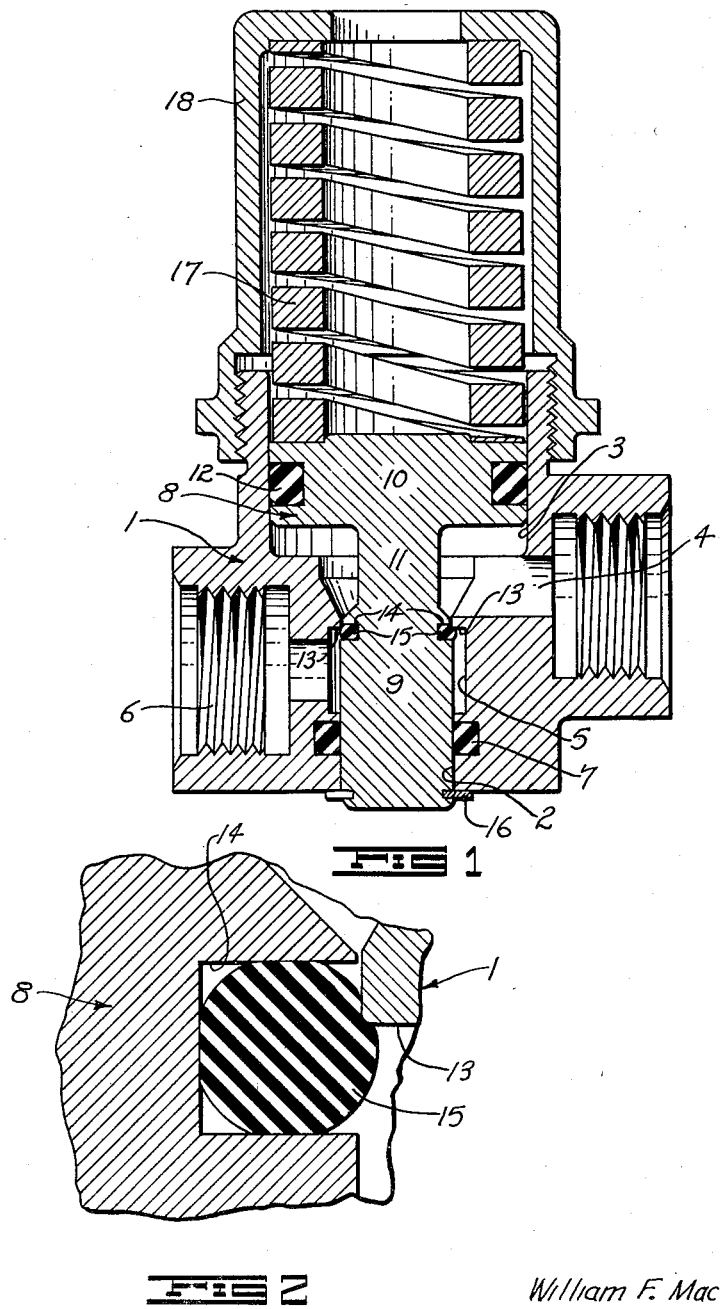
INVENTOR.
William F. Mac Glashan Jr.
BY
*Lyon + Lyon*
ATTORNEYS Patented Dec. 1, 1953

2,660,834

UNITED STATES PATENT OFFICE 2,660,834

PRESSURE REGULATOR

William F. MacGlashan, Jr., Alhambra, Calif., assignor to California Institute Research Foundation, Pasadena, Calif., a corporation of California Application February 11, 1949, Serial No. 75,797

7 Claims. (Cl. 50—35)

My invention relates to pressure regulators and included in the objects of my invention are:

First, to provide a pressure regulator which is extremely light weight and compact in construction and which involves a minimum number of parts.

Second, to provide a pressure regulator which incorporates a novelly arranged seal element and valve seat separating the high and low pressure sides of the regulator, the seal element being so arranged that it may pass through the valve seat during assembly or disassembly without damage, this arrangement making possible a simplified construction of the valve body.

Third, to provide a pressure regulator which, though not limited to pressure lines of small diameter, is particularly suited for manufacture in small sizes without affecting the dependability of its operation.

With the above and other objects in view as may appear hereinafter, reference is directed to the accompanying drawing in which:

Figure 1 is an enlarged longitudinal sectional view through a pressure regulator incorporating my invention; and Figure 2 is a still further enlarged fragmentary sectional view showing the novel seal means.

The valve includes a valve body 1 having a minor diametered bore 2 and a major diametered bore 3 in coaxial relation and intersecting opposite ends of the valve body. The major diametered bore 3 is intersected by a laterally directed outlet port 4. The minor diametered bore 2 is provided with an annular channel 5 which is intersected by a laterally directed inlet port 6. Between the channel 5 and the open end of the bore 2 there is provided a second internal channel which receives a seal ring 7, commonly known as an "O-ring."

The valve body receives a plunger 8 which includes a minor diametered piston 9 adapted to fit the bore 2 and a major diametered piston 10 connected to the piston 9 by a stem 11. The major diametered piston 10 fits within the bore 3 and is provided with an external channel adapted to receive a seal ring 12, preferably an O-ring.

The internal channel 5 at its extremity nearest the major diametered bore 3 forms a shoulder 13, the inner annular corner of which forms a valve seat. Opposite the shoulder 13 the minor diametered piston 9 is provided with a channel 14 which receives an O-ring 15. The O-ring 15 is adapted to engage the shoulder 13 to form a seal, as shown best in Fig. 2. The minor diametered piston 9 is so proportioned that it may pass through the annulus formed by the valve seat shoulder 13. The regulator seal ring 15 is slightly larger in diameter than this annulus but is capable of deformation to permit insertion of the minor diametered piston until the major portion of the seal ring is within the internal channel 5, so that its sealing contact with the shoulder 13 functions to prevent flow from the channel 5 to the major diametered bore 3.

The plunger 8 is prevented from movement beyond a position of sealing engagement between the seal ring 15 and shoulder 13 by means of a split retainer ring 16 which is fitted around the protruding end of the minor diametered piston 9.

The major diametered piston 10 is engaged by a regulator counterbalance spring 17 which is enclosed and compressed by means of a cap member 18 screw-threaded to the valve body externally of the major diametered bore 3. As shown in the drawings, the cap 18 is apertured so that the spring engaged side of the plunger is exposed to atmosphere. However, if desired the cap may be closed and a pressure fluid introduced in place of the spring or to exert a force in addition to that of the spring, in accordance with well established practice concerning regulator valves.

It will be observed that there is provided a regulator valve, the parts of which are extremely simple in construction and reduced to a minimum in number. It will also be observed that assembly or disassembly of the regulator valve is made possible without disconnecting the valve body from the line in which it is mounted. Also, by reason of the unique arrangement of the plunger 8 and the seal means between the ring 15 and shoulder 13, both the minor and major diametered bores of the valve body and their channels may be machined from one end of the valve body, thus facilitating accurate manufacture or the holding of close tolerances without excessive expense. It should also be observed that the valve lends itself to use in extremely small flow lines without limiting its use in larger sizes.

It should also be noted that, very light contact of the valve seat or shoulder 13 with the O-ring 15 is sufficient to close the regulator valve; whereas in conventional regulator valves, the contact pressure must be substantial in order to seal the valve.

Although I have shown and described a particular embodiment of my invention I do not wish to be limited thereto but desire to include in the scope of my invention the constructions, combinations, and arrangements set forth in the appended claims.

I claim:

1. A pressure regulator, comprising: a valve body defining a bore having major and minor diametered portions forming, respectively, a low pressure outlet chamber and a high pressure inlet chamber and an internal flange separating said chambers and forming a shoulder constituting a valve seat; a plunger including a major portion sealingly slidable in said low pressure chamber, and a minor portion sealingly slidable in said high pressure chamber, the minor diametered portion protruding from said valve body; a valve element carried by the minor diametered portion of said plunger, said valve element being engageable with and capable of passage through said valve seat; and positive stop means associated with the protruding end of said plunger to limit closing movement of said valve element through said valve seat to a position wherein said shoulder partially overlaps said valve element and the annular corner formed by said shoulder imbeds therein to effect a seal.

2. A pressure regulator, comprising: a valve body defining a bore having major and minor diametered portions forming, respectively, a low pressure outlet chamber and a high pressure inlet chamber and an internal flange separating said chambers and forming a shoulder constituting a valve seat; a plunger including a major portion sealingly slidable in said low pressure chamber, and a minor portion sealingly slidable in said high pressure chamber, the minor diametered portion protruding from said valve body; a valve element carried by the minor diametered portion of said plunger, said valve element being engageable with and capable of passage through said valve seat; positive stop means associated with the protruding end of said plunger to limit closing movement of said valve element through said valve seat to a position wherein said shoulder partially overlaps said valve element and the annular corner formed by said shoulder imbeds therein to effect a seal; a housing fitted over the major diametered end of said bore; and a spring mounted in said housing and bearing against said plunger to urge said plunger toward an open position.

3. A pressure regulator, comprising: a valve body defining a high pressure inlet chamber, a low pressure outlet chamber, a valve port communicating between said chambers, and a valve seating shoulder in said port confronting said high pressure chamber; a valve plunger including piston elements forming movable walls of said chambers and a connecting stem extending through said port; a valve element carried by said valve plunger and normally larger than said valve seat, said valve element being radially compressible to pass through said valve seat for assembly and disassembly of said valve body and plunger, and positive stop means for limiting sealing movement of said valve element relative to said valve seating shoulder whereby on seating, said shoulder partially overlaps and imbeds in said valve element.

4. A pressure regulator, comprising: a valve body defining a high pressure inlet chamber and a low pressure outlet chamber and a valve port means connecting said chambers; a valve plunger including piston elements in said chambers forming movable walls therefor and a stem means connecting said piston elements; a valve structure incorporating said stem means and said valve port means, said valve structure including a channel in one of said means, a toroidal sealing element therein, and a shoulder defined by the other of said means, said shoulder and sealing element adapted, in response to pressure in said inlet and outlet chambers to move relatively thereby to cause said shoulder to engage and radially distort toroidal sealing element and effect a seal; and a positive stop means to limit the relative sealing of said shoulder and sealing element, said shoulder and sealing element also being relatively movable past each other upon removal of said stop means, thereby to permit assembly and disassembly of said valve body and valve plunger.

5. A pressure regulator, comprising: a valve body defining an open ended bore having major and minor diametered portions and a valve port connecting said portions; a valve plunger having piston elements exposed at the extremities of said bore sealingly engageable with said portions and defining therewith high pressure and low pressure chambers, said valve plunger also including a stem extending through said port and connecting said piston elements; a valve means incorporating said valve port and valve plunger and involving a channel, a toroidal sealing element mounted therein, and an annular shoulder, said shoulder and sealing element adapted for relative movement whereby said shoulder engages and readily distorts said sealing element thereby to effect a seal; stop means engageable with the exposed end of said valve plunger to limit relative movement of said shoulder and sealing element to their sealing position; said shoulder and sealing element being relatively movable past each other on removal of said stop means to permit assembly and disassembly of said valve plunger and valve body.

6. A valve structure, comprising: a valve body having a coaxial major and minor chamber, a throat separating said chambers and forming a valve seat shoulder facing into said minor chamber; a valve plunger controlling flow from said minor chamber to said major chamber including a cylindrical portion movable in said minor chamber, a neck portion of reduced diameter movable through said throat, a head of major diameter movable in said major chamber, and a valve ring groove immediately adjacent said neck; an O-ring fitted in said groove and protruding radially from said plunger for engagement with said valve seat shoulder when said valve is closed, said neck portion and said throat walls forming the boundaries of the flow passage between said minor and major chambers when said valve is open.

7. A regulator valve comprising: a valve body having a major diameter low pressure outlet chamber and a minor diameter high pressure inlet chamber, a throat between said chambers diverging at its side facing the major diameter chamber and terminating in a shoulder facing the minor diameter chamber; a valve plunger including a cylindrical portion fitting said minor diameter chamber and sealingly engageable with said valve body beyond said minor diameter chamber, a neck portion movable in said throat, and a head movable in and sealingly engaging the walls of said major diameter chamber; said valve plunger having a ring groove in its cylindrical portion immediately adjacent said neck; an O-ring fitting said groove and protruding radially therefrom for sealing engagement with said shoulder when said valve is closed, the neck portion of said valve plunger and the walls of said throat forming the boundaries of the flow passage between said minor and major chambers.

when said valve is open; and means acting on said valve plunger head to urge said valve plunger toward its closed position.

WILLIAM F. MacGLASHAN, Jr.

References Cited in the file of this patent

UNITED STATES PATENTS

| Number | Name | Date |
|---|---|---|
| 251,726 | Mueller | Jan. 3, 1882 |
| 331,789 | Harvey | Dec. 8, 1885 |
| 554,455 | McKay | Feb. 11, 1896 |
| 776,839 | Hoffman | Dec. 6, 1904 |
| 2,106,671 | Watson | Jan. 25, 1938 |
| 2,286,027 | Towler | June 9, 1942 |
| 2,360,733 | Smith | Oct. 17, 1944 |
| 2,513,976 | Weatherhead | July 4, 1950 |
| 2,542,390 | Brown | Feb. 20, 1951 |
| 2,624,542 | Ghormley | Jan. 6, 1953 |

FOREIGN PATENTS

| Number | Country | Date |
|---|---|---|
| 657,056 | Great Britain | of 1951 |